UNITED STATES PATENT OFFICE.

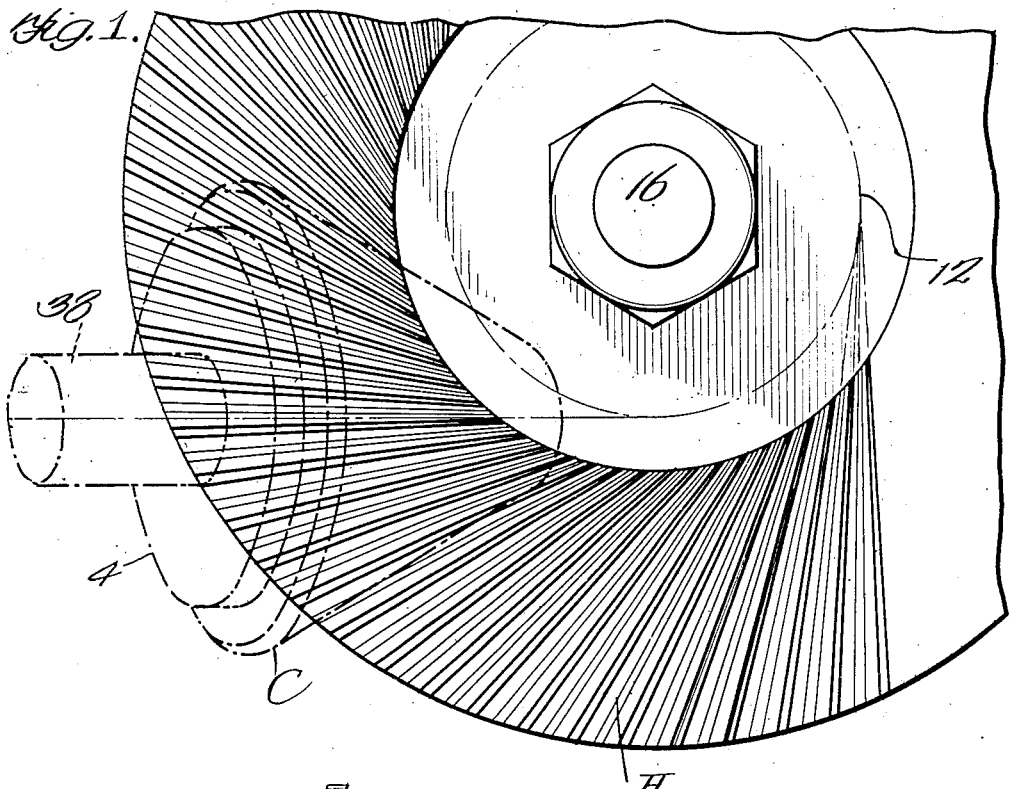
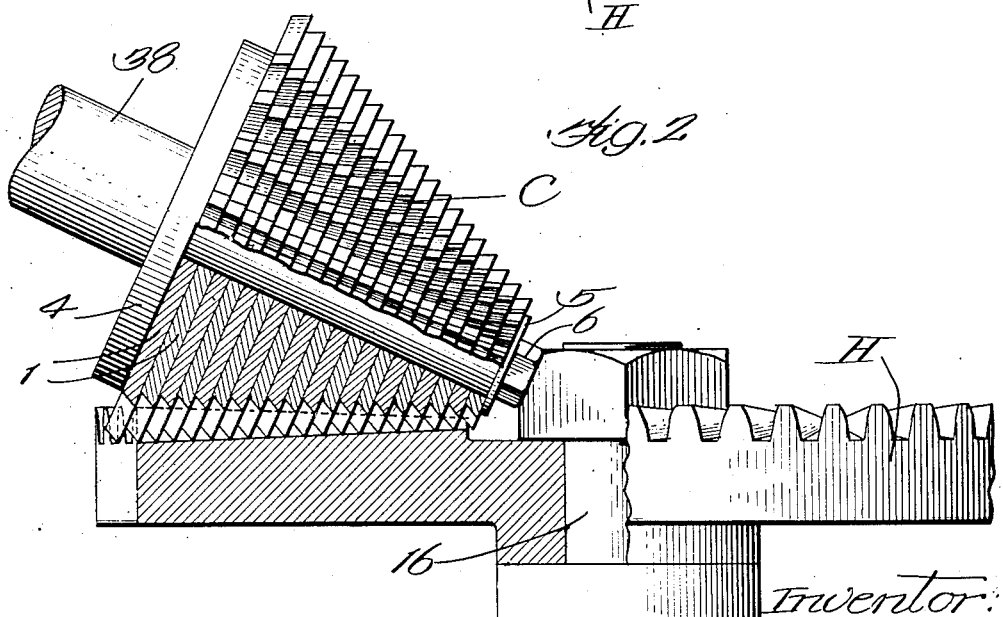

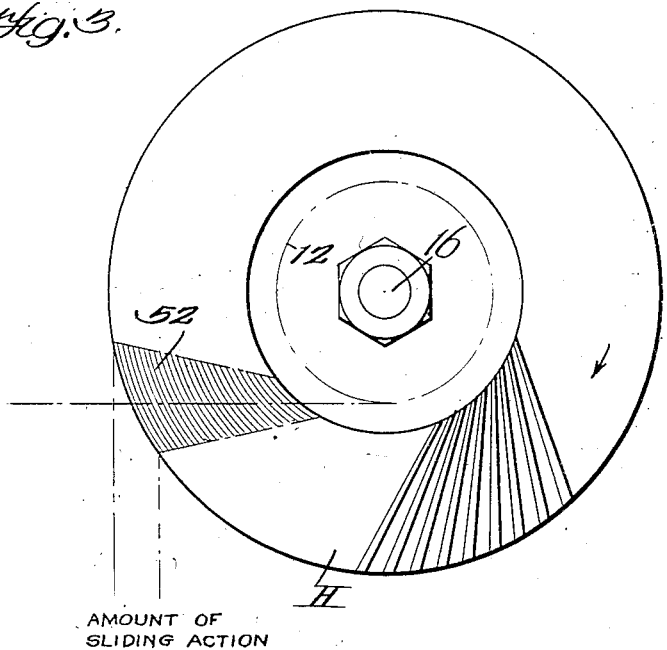
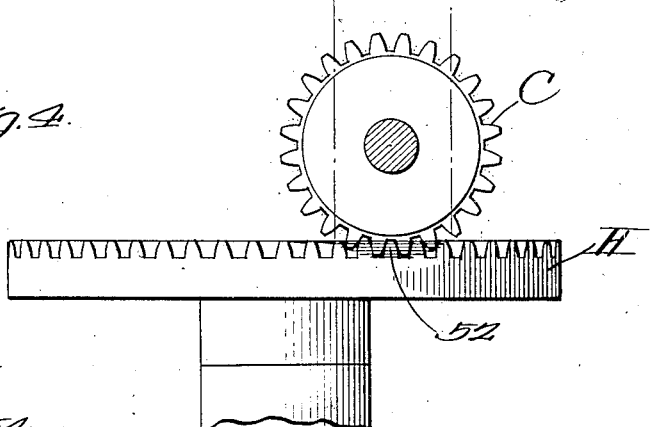
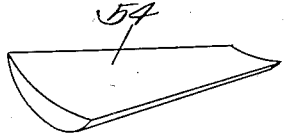

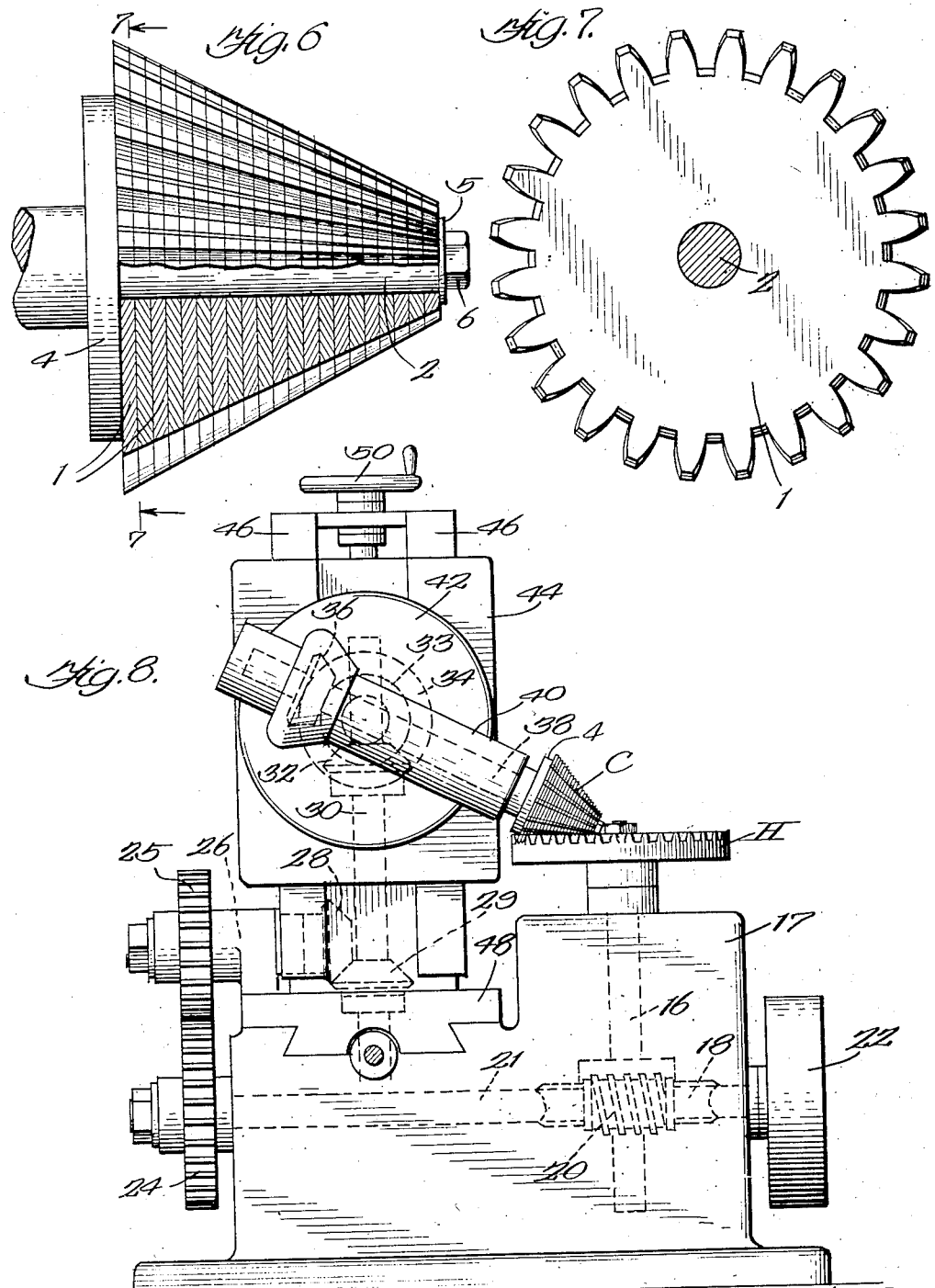

CARL G. OLSON, OF CHICAGO, ILLINOIS, ASSIGNOR TO ILLINOIS TOOL WORKS, OF CHICAGO, ILLINOIS, A CORPORATION OF ILLINOIS.

CUTTER FOR GENERATING SKEW BEVEL-GEARS.

1,398,039.  Specification of Letters Patent.  Patented Nov. 22, 1921.

Application filed November 24, 1920. Serial No. 426,293.

*To all whom it may concern:*

Be it known that I, CARL G. OLSON, a citizen of the United States, residing at Chicago, in the county of Cook and State of Illinois, have invented a certain new and useful Improvement in Cutters for Generating Skew Bevel-Gears, of which the following is a specification.

My invention relates to cutters or hobs, and the object is to produce a tool capable of generating skew bevel gears. By "generating" I mean completing the cutting in a single continuous operation without requiring any reindexing of the work or any step-placing of the work relatively to the cutter or of the cutter relatively to the work.

As a preliminary to an explanation of the invention it may be mentioned that when skew gears coöperate there is a sliding action of the intermeshing teeth upon each other. I have discovered means for taking advantage of this fact and have produced a tool capable of completely cutting a theoretically accurate skew bevel gear in a single setting.

In the accompanying drawings I have illustrated a cutter embodying the invention, a sample of the work which it is capable of producing, and a machine adapted to employ it. In these drawings—

Figure 1 is a face view of a fragment of a skew bevel gear which my cutter is adapted to cut. This figure shows in dot and dash lines the position which the cutter will occupy during the act of generating a skew bevel gear.

Fig. 2 is a view of my cutter shown in the act of generating a skew bevel gear. A portion of the cutter and a portion of the gear are shown in axial section.

Fig. 3 is largely diagrammatic and shows the face view of a skew bevel gear which my cutter is capable of producing. The shaded area shows the zone or region of action of the cutter upon the gear blank at the time when the latter is practically completed.

Fig. 4 is a view illustrating the coaction of the cutter as it is about to finish the bevel gear. The shaded area shows in elevation the region of action of the cutter upon the work.

Fig. 5 is a diagram showing in perspective the shape of the region of coaction between the cutter and the practically finished bevel gear.

Fig. 6 is a side view partly in section illustrating one manner in which a cutter embodying my invention may be manufactured.

Fig. 7 is a view on the line 7—7, Fig. 6 and shows a face view of one of the plates or laminations.

Fig. 8 is an elevation of a machine in which my cutter may be employed for producing a skew bevel gear.

Like numerals denote like parts throughout the several views.

In the form selected to illustrate the invention my cutter consists of a plurality of plates 1, a single one of which is shown in Fig. 7. It will probably facilitate an understanding of the cutter itself to explain one of the methods by which it may be manufactured. For this purpose attention is called particularly to Figs. 2 and 6. In these figures it will be seen that the plates are mounted in surface contact with each other upon an arbor 2. They are held clamped between a base plate 4 and a crown plate or washer 5, the latter being held tightly to its work by a cap screw 6 which screws into the internally threaded outer end of the arbor. The manner of clamping the plates together may be greatly varied, but the essential point is that they are firmly held in contact with each other upon an arbor or shaft capable of rotating the device about its longitudinal axis. The plates are of graded diameter so that when thus assembled, and before the teeth are cut in them they form a right truncated cone, similar to the blank of an ordinary bevel pinion. After the plates have been clamped together, as described, teeth are formed in them as shown in Fig. 6. Various ways are known for producing bevel gears or pinions and the manner of producing the device or assemblage of Fig. 6 is immaterial although a hob capable of producing it is illustrated in my copending application filed November 24, 1920, Serial No. 426,292.

There are some cases of skew bevel gearing in which the teeth of both of the gears are skewed. In other cases the teeth of one of the gears are skewed while in the coöperating gear they converge toward a common point on the axis of rotation.

In the present application I have illustrated a type of cutter in which the teeth are not skewed, although the principle of my invention may be applied to cutters in which the teeth are skewed and are capable of producing a skew bevel gear. Referring to the illustrated construction in its intermediate stage, Fig. 6, the plates while assembled, are so cut as to form an ordinary bevel gear or pinion; consequently the edges of the plates when viewed in profile or from the edge, as in Fig. 6, converge toward a common point located at a remote point on the axis. It will be evident that both the tops and the sides of the teeth thus formed in the plates converge, the result being that when the plates are reversed (as they are in the finished cutter) the cutter teeth will have both side and top clearance or relief.

After the intermediate stage of Fig. 6 is completed the cap screw 6 and plate 5 are removed so that the plates can be slipped off endwise from the arbor. The plates are then individually reversed and put back on the arbor and clamped in place whereupon the device will be converted from the form shown in Fig. 6 to the one shown in Fig. 2. The teeth will all be in the same general alinement as before but as the plates are reversed the relief or taper of the individual teeth will be counter to the taper of the device as a whole. The cutter is now complete and may be used for producing skew bevel gears and also for producing hobs such as illustrated in the aforesaid copending application.

In use my cutter is fed toward the work in a direction parallel to the axis of rotation of the work, and in order to explain this I have illustrated in Fig. 8 a machine capable of enabling my cutter to perform its function. In the form of machine shown, the work indicated in general by "H" is secured to an arbor 16, journaled in the machine frame 17 and rotated by a worm wheel 18 which meshes with a worm 20 fastened to a drive shaft 21. This drive shaft is rotated by a band wheel 22 or other suitable form of power device, and has fastened to it a spur gear 24 which meshes with a spur gear 25 for imparting rotation to the cutter which is indicated in general by C. In the construction illustrated, gear wheel 25 is fastened to a shaft 26 provided with a bevel gear wheel 28, which meshes with a bevel gear wheel 29, rigidly fastened to a vertical shaft 30. Shaft 30 has splined to it a bevel gear wheel 32 which meshes with a bevel gear wheel 33, the latter being fastened to or integral with a concentric bevel gear wheel 34 which meshes with a bevel gear wheel 36, splined to the cutter spindle 38. The cutter C is fastened to said spindle and the spindle itself is journaled in a sleeve or housing 40, mounted upon and rotatable with the indexing head 42. Said head is mounted upon the vertically movable carriage 44 of the machine, and is rotatable about an axis concentric with the axis of the gear wheels 33, 34. This makes it possible to use cutters having different degrees of bevel. The carriage is vertically movable in guides 46 carried by a horizontally movable carriage 48 mounted upon the main frame 17. Carriage 44 may be raised and lowered by means of a hand wheel 50 together with a feed screw and nut (not shown). As mechanisms for causing a carriage to travel along its guides are well known, they need not be described in detail here.

It will be obvious that the cutter C and gear blank H will rotate in synchronism about their respective axis as is usual in hobbing machines. In using my cutter, however, it is fed toward the face of the gear blank in a direction parallel to the work axis.

In operation, as the cutter and the blank rotate, as soon as the two come into contact, a sliding action takes place, after the manner of ordinary skew gears. This sliding action causes the teeth of the cutter to cut the metal of the gear blank, and as the cutter is fed downward the teeth are gradually formed. The region of action of the cutter upon the work is indicated by the shaded area 52 shown in Figs. 3 and 4. It extends from the outer periphery of the work to the inner circle 12 thereof. This region has three dimensions, and its shape is approximately indicated in perspective at 54, Fig. 5.

From the foregoing it will be seen that my cutter is capable of generating, with a single setting and without any indexing or spacing operation, a skew gear or skew hob, the latter illustrated in my copending application Serial No. 426,292. The generated bevel gear will, of course, be accurate theoretically as well as practically, for the action is a true generating action in distinction to a cutting action requiring indexing as with an ordinary milling cutter. As my device operates on the generating principle, it might also be termed a "hob" although I employ the term "cutter" in the more general sense.

Having thus described my invention what I claim as new and desire to secure by Letters Patent, is:—

1. A cutter for generating skew bevel gears, said cutter having the general form of a cone and having teeth facing the apex of the cone.

2. A cutter for generating skew bevel gears, the cutter having rows of teeth converging toward a common point on the axis of rotation of the cutter, the cutting planes facing toward the point of convergence.

3. A cutter for generating skew bevel gears consisting of a plurality of plates arranged parallel to each other about a common axis, the plates as a group resembling a cone, and the plates having spur teeth with cutting edges, the teeth being relieved in such direction that the flare of each plate is opposite to the flare of the cutter as a whole.

4. A cutter consisting of a plurality of coaxial plates which when reversed plate by plate form a bevel gear and which, consequently, when arranged normally, have teeth which are relieved in a direction counter to the taper of the cutter as a whole.

5. A built-up cutter for generating skew bevel gears, said cutter comprising an arbor, a plurality of clamping plates, and a set of cutting plates mounted on the arbor and held between the clamping plates, the cutting plates when reversed plate by plate constituting a conical bevel gear and when arranged normally presenting in general the appearance of a conical bevel gear but with teeth relieved on a taper which is counter to the taper of the cutter as a whole.

In witness whereof, I have hereunto subscribed my name.

CARL G. OLSON.